(12) United States Patent
Higuchi (10) Patent No.: US 8,480,126 B2
(45) Date of Patent: Jul. 9, 2013

(54) AIRBAG

(75) Inventor: Hitoshi Higuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/574,349

(22) PCT Filed: Nov. 11, 2010

(86) PCT No.: PCT/JP2010/070109
§ 371 (c)(1),
(2), (4) Date: Jul. 20, 2012

(87) PCT Pub. No.: WO2011/092923
PCT Pub. Date: Aug. 4, 2011

(65) Prior Publication Data
US 2012/0292896 A1     Nov. 22, 2012

(30) Foreign Application Priority Data
Jan. 28, 2010  (JP) ................. 2010-016887

(51) Int. Cl.
*B60R 21/16* (2006.01)
(52) U.S. Cl.
USPC ...................... 280/731; 280/743.1

(58) Field of Classification Search
USPC ............................... 280/743.1, 731
See application file for complete search history.

(56) References Cited

U.S. PATENT DOCUMENTS 8,267,425 B2 *   9/2012  Chida et al. ............. 280/736
2003/0222446 A1 * 12/2003  Soderquist et al. ....... 280/743.1

FOREIGN PATENT DOCUMENTS

| JP | 63-34752 | 3/1988 |
| JP | 2001-277991 | 10/2001 |
| JP | 2003-312421 | 11/2003 |
| JP | 2007-302224 | 11/2007 |

* cited by examiner

Primary Examiner — Faye M. Fleming
(74) Attorney, Agent, or Firm — Rankin, Hill & Clark LLP (57) ABSTRACT

An airbag including first and second sheets joined along outer peripheral parts. The second sheet includes a plurality of base cloths. The plurality of base cloths are arrayed around the circumferential direction, and include overlapping parts where adjacent ends are overlapping. At least one of the overlapping parts includes unjoined sections that are not joined together, and the gas inside the airbag can be ejected through the unjoined sections.

5 Claims, 8 Drawing Sheets

AIRBAG

TECHNICAL FIELD

The present invention relates to an airbag adapted for deployment by gas generated by an inflator, and particularly relates to a vehicle airbag.

BACKGROUND ART

When collision energy acts on a vehicle, for example, a vehicle airbag deploys in front of a vehicle occupant sitting in a driver seat or a passenger seat, thereby protecting the vehicle occupant.

Airbags of the type described have a vent hole. The vent hole is a gas-releasing hole through which some of the gas is ejected to the exterior so as to restrict excessive increases in internal pressure when the airbag is deployed. The size of the vent hole is set in advance and does not change. Therefore, the ejection rate or quantity of gas ejected to the exterior from the vent hole cannot be precisely controlled in accordance with the state in which a vehicle occupant collides with the deployed airbag.

From an initial stage in which the airbag begins to deploy in front of the vehicle occupant, the gas inside the airbag begins to be ejected to the exterior through the vent hole. To increase the airbag's performance of protecting the vehicle occupant, it is preferable that the internal pressure of the airbag be maintained over a long period of time. However, the ejection rate and quantity of the gas ejected to the exterior from the vent hole cannot be controlled.

Thus, an improvement can be made in regard to merely having a vent hole in the airbag, in terms of precisely controlling the internal pressure of the airbag. In view whereof, techniques for controlling the internal pressure of an airbag have recently been developed (see Patent Document 1, for example).

The airbag taught in Patent Document 1 has a vent hole cover for closing the vent hole. This vent hole cover comprises a plurality of sewn parts sewn into the airbag. The sewn parts sequentially rupture as the internal pressure increases when the airbag is deployed, and the rupturing concludes at the end of the airbag deployment. As a result, the vent hole cover is removed from the vent hole, and therefore the vent hole is opened. In other words, it is possible to control the timing with which the gas inside the airbag is ejected to the exterior from the vent hole.

However, in the airbag known in Patent Document 1, the size of the vent hole is set in advance and does not change. Therefore, the ejection timing, ejection rate, and quantity of the gas ejected to the exterior from the opened vent hole cannot be precisely controlled in accordance with the state in which the vehicle occupant collides with the deployed airbag. Moreover, in the airbag known in Patent Document 1, since the vent hole cover for closing the vent hole is sewn, controlling the ejection timing, ejection rate, and ejected quantity of the gas in accordance with the state in which the vehicle occupant collides with the deployed airbag inevitably makes the configuration complicated and causes cost to increase.

PRIOR ART LITERATURE

Patent Documents

[Patent Document 1] Japanese Patent Application Laid-Open Publication No. 2007-302224

SUMMARY OF INVENTION

Technical Problem

An object of the present invention is to provide a technique whereby the ejection timing, ejection rate, and quantity of a gas ejected to the exterior from an airbag can be precisely controlled.

Solution to Problem

According to the invention, as defined in claim 1, there is provided an airbag comprising a first sheet near a protected object, and a second sheet far from the protected object, wherein outer peripheral parts of the first sheet and the second sheet are joined, characterized in that the second sheet is formed by a plurality of divided base cloths, the base cloths are arrayed along a circumferential direction and have overlapping parts where adjacent ends are overlapping, at least some of the overlapping parts have unjoined sections not joined together, and when the airbag deploys and the protected object collides therewith, a gas can be ejected through the unjoined sections.

In the invention, as defined in claim 2, preferably, the second sheet is circular in overall shape, each of the base cloths is formed into a fan shape with reference to a center of the circular second sheet, and the unjoined sections extend in a radial direction with reference to the center of the circular second sheet.

In the invention, as defined in claim 3, preferably, at least one value among the number of the unjoined sections, an overlap width of the overlapping parts in the unjoined sections, and a length of the unjoined sections is set such that the unjoined sections begin to open from a stage in which the protected object collides with the deployed airbag.

In the invention, as defined in claim 4, preferably, the airbag of the second aspect is accommodated in a hub of a vehicle steering wheel, and the unjoined sections are positioned such that at least some of the unjoined sections do not overlap a spoke of the vehicle steering wheel when the airbag deployed in a passenger compartment is viewed from a front side of the vehicle.

In the invention, as defined in claim 5, preferably, the unjoined sections are plural in number, and the plural unjoined sections are positioned evenly in the circumferential direction with reference to the center of the circular second sheet.

Advantageous Effects of Invention

In the invention, as defined in claim 1, the plurality of base cloths is arrayed along the circumferential direction and adjacent ends overlap, constituting the overlapping parts. At least some of the overlapping parts are configured as a plurality of unjoined sections which are not joined together. These unjoined sections can be set so as to not open at the internal pressure at the time the airbag has completely deployed. Therefore, the airbag can essentially preserve the deployed shape.

When the protected object (the vehicle occupant) collides with the deployed airbag, the airbag deforms, whereby the unjoined sections open and excess gas inside the airbag can be ejected to the exterior. Therefore, the ejection timing, the ejection rate, and the quantity of the gas ejected to the exterior from the unjoined sections can be precisely set (controlled) in accordance with the collision mode of the protected object against the deployed airbag. Moreover, in order for the ejection timing, the ejection rate, and the ejected quantity to be set according to the airbag, the configuration is simple, merely in which at least some of the overlapping parts of the plurality of base cloths are not joined. Examples of the collision mode include a first collision mode in which the protected object collides with an outer peripheral part of the deployed airbag, and a second collision mode in which the protected object collides with a front surface of the deployed airbag.

In the invention, as defined in claim 2, the plurality of unjoined sections extends in the radial direction with reference to the center of the circular second sheet. The shape of the airbag is changed by the colliding protected object. As the shape changes, the plurality of base cloths is pulled in the circumferential direction about the center, along the surface of the second sheet. Since the unjoined sections extend in the radial direction with reference to the center, the pulling action in the circumferential direction about the center can be effectively utilized to begin to reliably open the unjoined sections with the proper timing.

In the invention, as defined in claim 3, due to at least one value among the number of the unjoined sections, the overlap width of the overlapping parts in the unjoined sections, and the lengths of the unjoined sections being set in advance, the unjoined sections begin to open from the stage in which the protected object collides with the deployed airbag. Thus, the ejection timing, the ejection rate, and the quantity of the gas ejected to the exterior from the unjoined sections can be precisely set in accordance with the collision mode of the protected object against the deployed airbag.

In the invention, as defined in claim 4, the unjoined sections are positioned such that at least some of the unjoined sections do not overlap the spoke of the steering wheel when the airbag deployed in the passenger compartment is viewed from the front side of the vehicle. Therefore, when the gas inside the airbag is ejected to the exterior from the unjoined sections, the ejected gas can flow into the passenger compartment without being blocked by the spoke. Consequently, excess gas inside the airbag can be quickly and reliably ejected to the exterior.

In the invention, as defined in claim 5, the unjoined sections are plurality in number. The plural unjoined sections are positioned evenly in the circumferential direction about the center of the circular back surface section. Therefore, the positional relationship of the plural unjoined sections to the steering wheel does not change regardless of the steering state of the steering wheel, and the unjoined sections are also positioned evenly in the circumferential direction relative to the steering wheel. Consequently, no matter what area of the deployed airbag the protected object collides with, the shape of the airbag locally collapses (or deforms) readily. As a result, some of the unjoined sections locally open readily, and ejection of the gas is begun readily.

BRIEF DESCRIPTION OF DRAWINGS

FIG. 5(*a*) is a view illustrating a configuration of a second unjoined section of FIG. 2;

FIG. 5(*b*) is a cross-sectional view taken along line b-b of FIG. 5(*a*);

FIGS. 7(*a*) through 7(*i*) are views illustrative of the operation of the airbag shown in FIG. 2.

DESCRIPTION OF EMBODIMENTS

Certain preferred embodiments of the present invention will be described below with reference to the accompanying sheets of drawings.

First Embodiment

Figure 1:
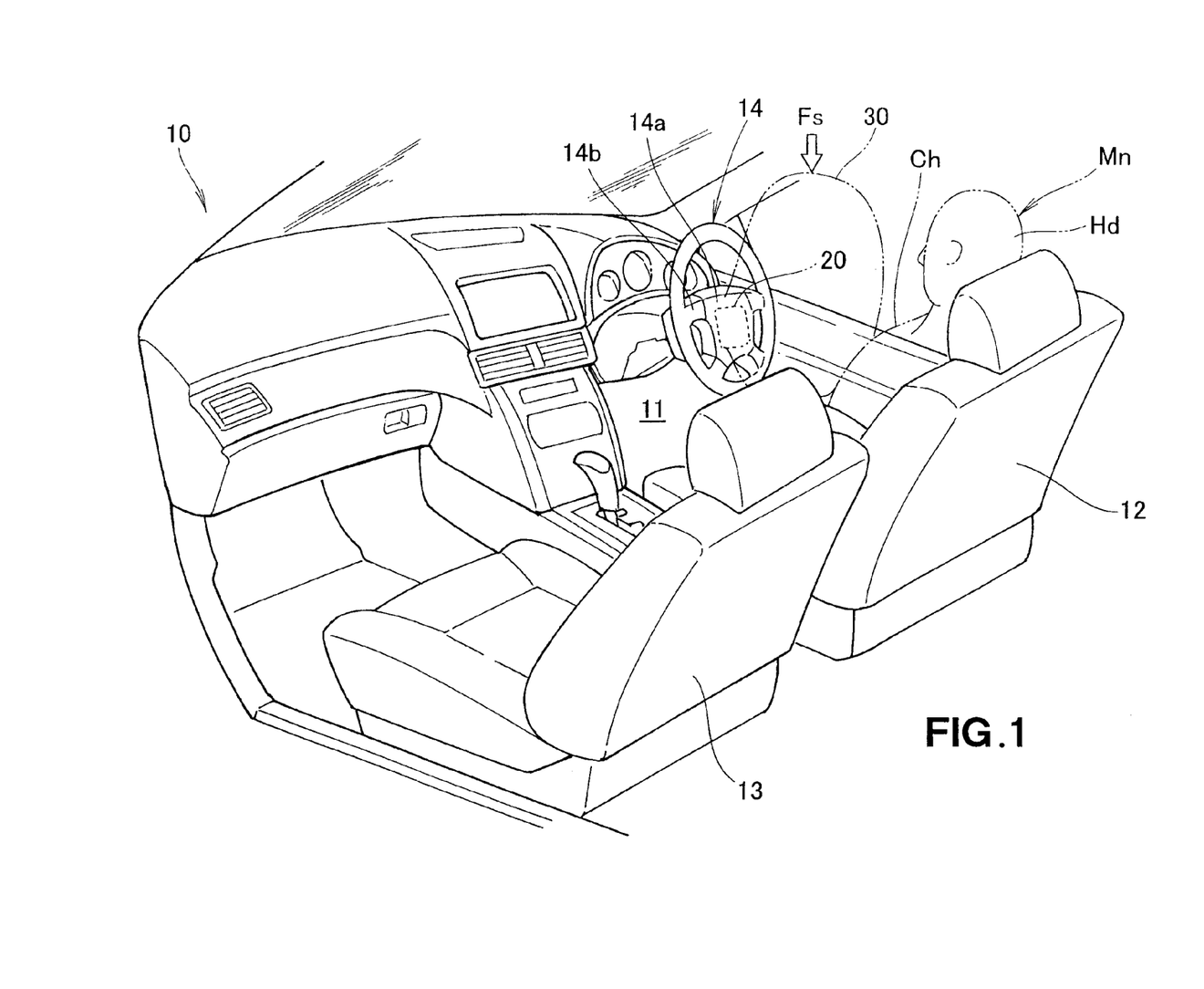
FIG. 1 is a perspective view showing the interior of a vehicle equipped with an airbag according to a first embodiment of the present invention.

As shown in FIG. 1, a vehicle 10 is equipped with an airbag device 20. When collision energy acts on the vehicle 10, the airbag device 20 causes an airbag 30 to be deployed into a passenger compartment 11 by high-pressure gas generated by an inflator 21 (see FIGS. 3 and 4). The airbag 30 is deployed in front of a vehicle occupant Mn sitting in a driver seat 12, a passenger seat 13, or another seat such as rear seat (not shown), and the airbag 30 protects the vehicle occupant Mn by restraining the vehicle occupant Mn. In the present embodiment, a device for protecting a vehicle occupant Mn (a driver Mn) sitting in the driver seat 12 is described as an example of the airbag device 20.

Figure 2:
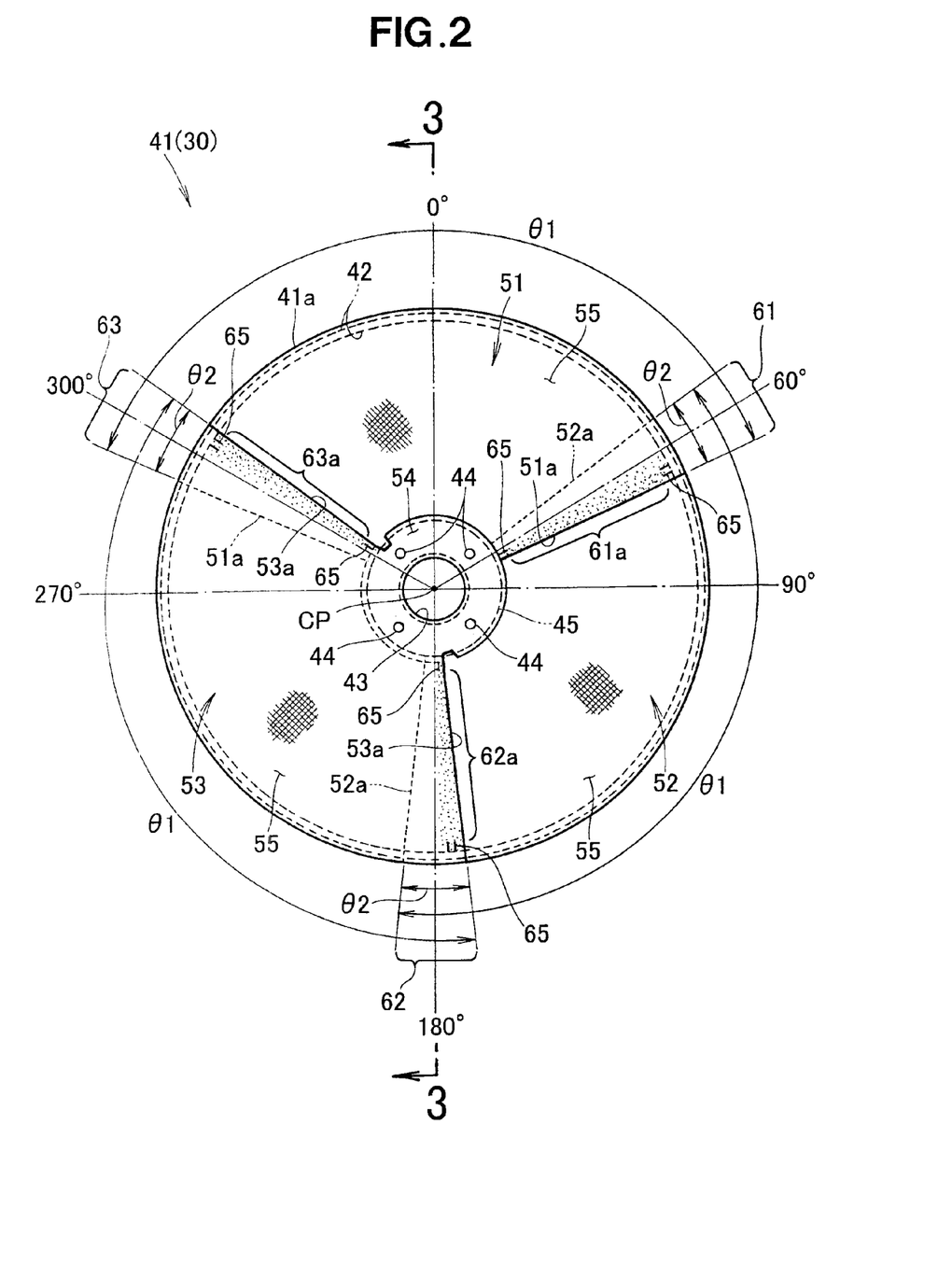
FIG. 2 is a view of an enlarged configuration of the airbag shown in FIG. 1, as seen from the front side of the vehicle.
Figure 3:
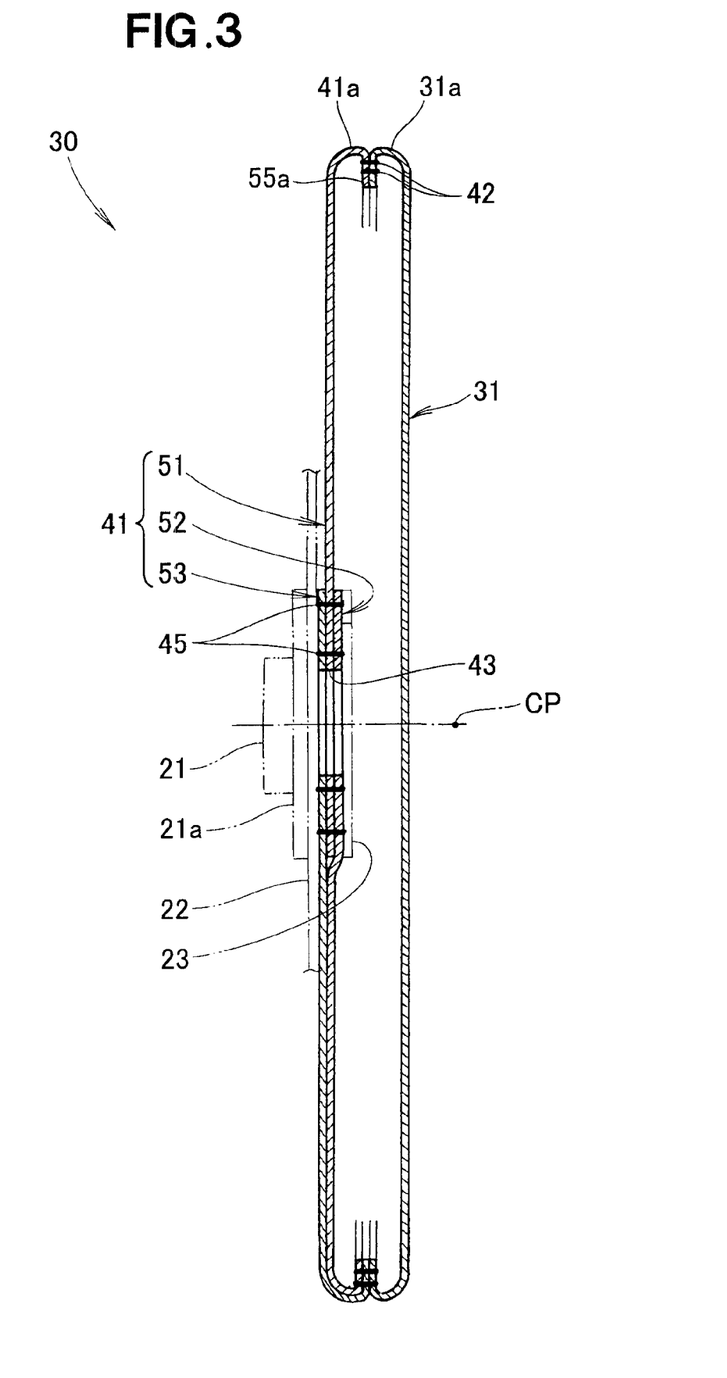
FIG. 3 is a cross-sectional view taken along line 3-3 of FIG. 2.
Figure 4:
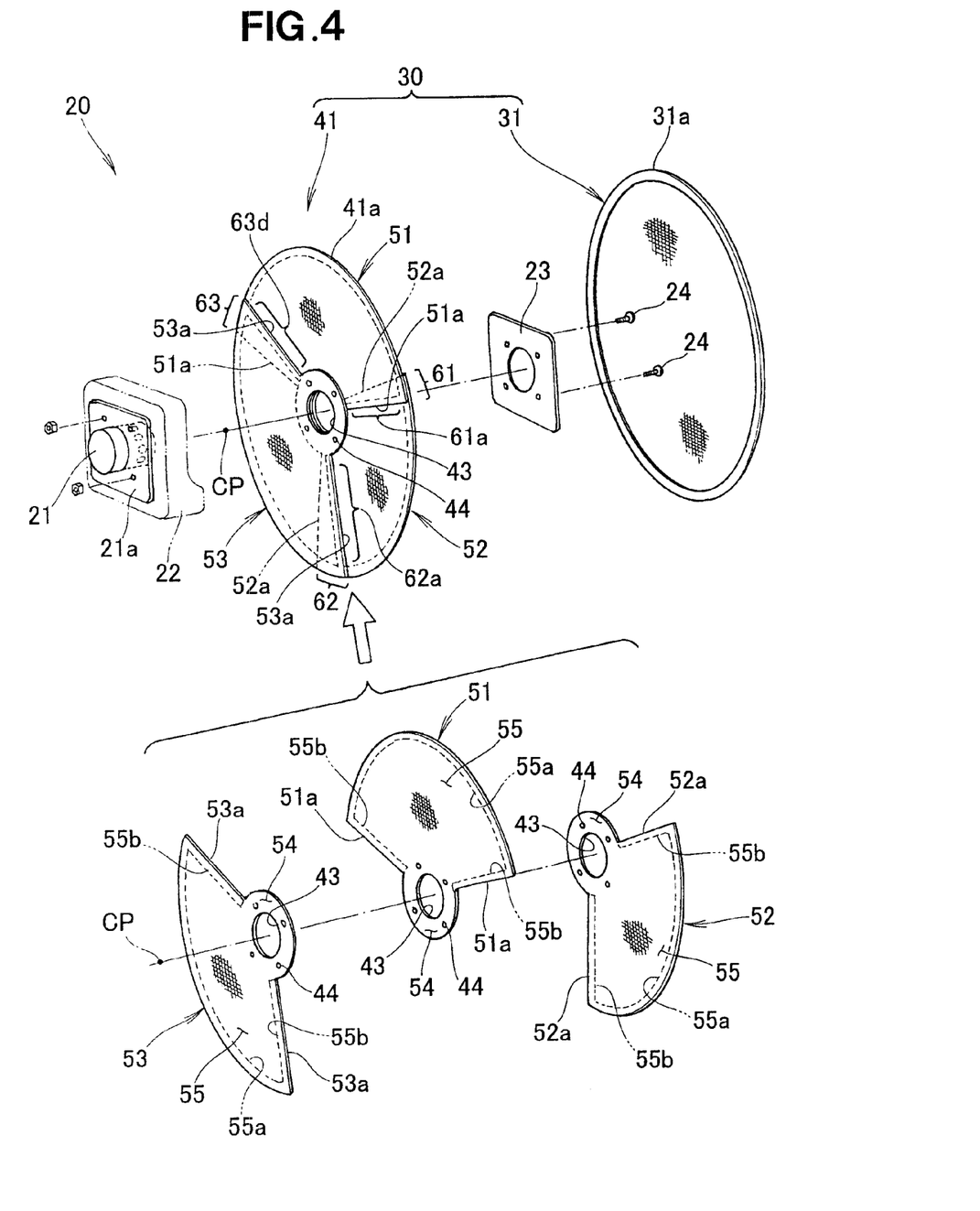
FIG. 4 is an exploded view of the airbag shown in FIG. 3.

The airbag device 20 is described hereinbelow in detail. FIG. 2 shows the airbag 30 as seen from the front side of the vehicle 10. The airbag device 20, as shown in FIGS. 3 and 4, is composed of the inflator 21, a retainer 22, a fixing ring 23, and the airbag 30, which are shown by the imaginary lines.

When the inflator 21 receives an ignite signal from a controller (not shown) due to collision energy acting on the vehicle 10, the inflator 21 ignites a gas-forming agent, whereby high-pressure gas for deploying the airbag (hereinbelow referred to simply as "gas") is generated and supplied to the airbag 30. The inflator 21 has a mounting flange 21*a*. The retainer 22 is a member for retaining the airbag 30 in a folded state and supporting the inflator 21, and is provided over a steering wheel 14 (FIG. 1). The mounting flange 21*a* is bolted to the retainer 22, whereby the inflator 21 is fixed to a hub 14*a* of the steering wheel 14 shown in FIG. 1. As a result, the airbag 30 is accommodated in the hub 14*a* of the steering wheel 14.

The airbag 30 is composed of a rear-side sheet (a first sheet) 31 and a front-side sheet (a second sheet or a back-surface section) 41. Both the rear-side sheet 31 and the front-side sheet 41 are circular in overall shape. The circular airbag 30 is configured by the rear-side sheet 31 and the front-side sheet 41 overlapping each other and outer peripheral parts 31*a*, 41*a* being joined together (sewn integrally at sutured parts 42 in the outer periphery).

When the airbag 30 is deployed into the passenger compartment 11 as shown in FIG. 1, the rear-side sheet 31 is the section on the front surface (the bag rear half) that faces the vehicle occupant Mn being protected, and is configured from a single base cloth.

When the airbag 30 is deployed into the passenger compartment 11 as shown in FIG. 1, the front-side sheet 41 is the section on the back surface (the bag front half) that does not come in contact with the vehicle occupant Mn, i.e., a section positioned so as to face the steering wheel 14. Hereinbelow, the front-side sheet 41 is appropriately referred to as the "back-surface section 41."

Formed in the front-side sheet 41 are one inflator insertion hole 43 and a plurality of bolt holes 44. The inflator insertion hole 43 is disposed in the center CP of the front-side sheet 41 (the center CP of the airbag 30, the center CP of the circle), and is a circular through-hole that encircles the inserted inflator 21. The gas generated by the inflator 21 is supplied into the airbag 30.

The plurality of bolt holes 44 is disposed in the periphery around of the inflator insertion hole 43. The front-side sheet 41 and the fixing ring 23 are made to overlap the mounting flange 21a of the inflator 21, and bolts 24 (see FIG. 4) inserted through the bolt holes 44 are screwed into the mounting flange 21a, whereby the airbag 30 is mounted to the retainer 22.

The front-side sheet 41 (the back-surface section 41) is a complex configured integrally from a plurality of divided base cloths 51 to 53. In the illustrated first embodiment, the front-side sheet 41 is formed by three base cloths 51 to 53. The plurality of base cloths 51 to 53 are arranged evenly along the sheet surface (the back surface) of the front-side sheet 41, and only the ends (the borders) 51a, 52a, 53a, which are adjacent in the circumferential direction, overlap each other. These overlapping sections 61 to 63 are hereinbelow referred to as "overlapping parts 61 to 63." The respective overlapping parts 61 to 63 are positioned evenly in the circumferential direction with reference to the center CP of the circle.

When the deployed airbag 30 is viewed from the front side of the vehicle 10 as shown in FIG. 2, with reference to the center CP of the circle, the point equivalent to 12:00 on a clock is designated as 0°, and the angle increases clockwise based on this point 0°. The plurality of base cloths 51 to 53 is appropriately referred to as the "first base cloth 51," the "second base cloth 52," and the "third base cloth 53." The first base cloth 51 is positioned at the point 0°, and the second base cloth 52 and third base cloth 53 are positioned sequentially clockwise.

The first overlapping part 61 is a section where an end 51a of the first base cloth 51 and an end 52a of the second base cloth 52 overlap one another front-to-back. The second overlapping part 62 is a section where the end 52a of the second base cloth 52 and an end 53a of the third base cloth 53 overlap one another front-to-back. The third overlapping part 63 is a section where the end 53a of the third base cloth 53 and the end 51a of the first base cloth 51 overlap one another front-to-back.

To be more specific, the plurality of base cloths 51 to 53 are formed into a fan shape with reference to the center CP of the circle so that the front-side sheet 41 describes an overall circular shape. The central angles θ1 of this fan are uniform or nearly uniform. The overlapping angles θ2 (overlap width) of the respective overlapping parts 61 to 63, where the plurality of base cloths 51 to 53 are adjacent to each other, are uniform or nearly uniform.

The overlapping angles θ2 are set to optimal values that take into account the ejection starting pressure, the ejection rate, and the quantity of the gas ejected to the exterior from the airbag 30. The first overlapping part 61 is positioned at the point 60°, the second overlapping part 62 is positioned at the point 180°, and the third overlapping part 63 is positioned at the point 300°.

The overlap widths of the overlapping parts 61 to 63 may be uniform, for example, rather than being set to the overlapping angles θ2.

The base cloths constituting the rear-side sheet 31 and the plurality of base cloths 51 to 53 are all composed of cloths, i.e., flexible panels of the same material and the same thickness. These cloths have different friction characteristics (friction resistance) on the front and back sides. For example, the friction characteristics differ in the front and back sides due to a silicon coating being formed on one side of the cloth. The rear-side sheet 31 and the plurality of base cloths 51 to 53 face each other with the sides that have low friction resistance.

The base cloths 51 to 53 will be described in greater detail. Each of the base cloths 51 to 53 is composed of a middle circular base part 54 extending around the center CP, and a fan part 55 connected to an outer periphery of the base part 54. The inflator insertion hole 43 and the bolt holes 44 are opened in the middles of the base parts 54. The base parts 54 in the respective base cloths 51 to 53 are all made to overlap and are joined together (sewn integrally at a sutured part 45). Therefore, the strength of the inflator insertion hole 43 section in the front-side sheet 41 increases.

The fan parts 55 each have an arcuate folding part 55a and linear folding parts 55b, 55b. The arcuate folding parts 55a are arcuate folding sections in which edges are formed by the arcuate edges of the fans being folded back toward the rear-side sheet 31. The arcuate folding parts 55a constitute the outer peripheral part 41a of the front-side sheet 41 shown in FIG. 3. The linear folding parts 55b, 55b are substantially linear folding sections in which edges are formed by the edges at both circumferential ends of the fans (equivalent to the ends 51a, 52a, 53a in the circumferential direction of the plurality of base cloths 51 to 53) being folded back toward the rear-side sheet 31. The linear folding parts 55b, 55b are sutured so as to preserve the edged state.

Figure 5:
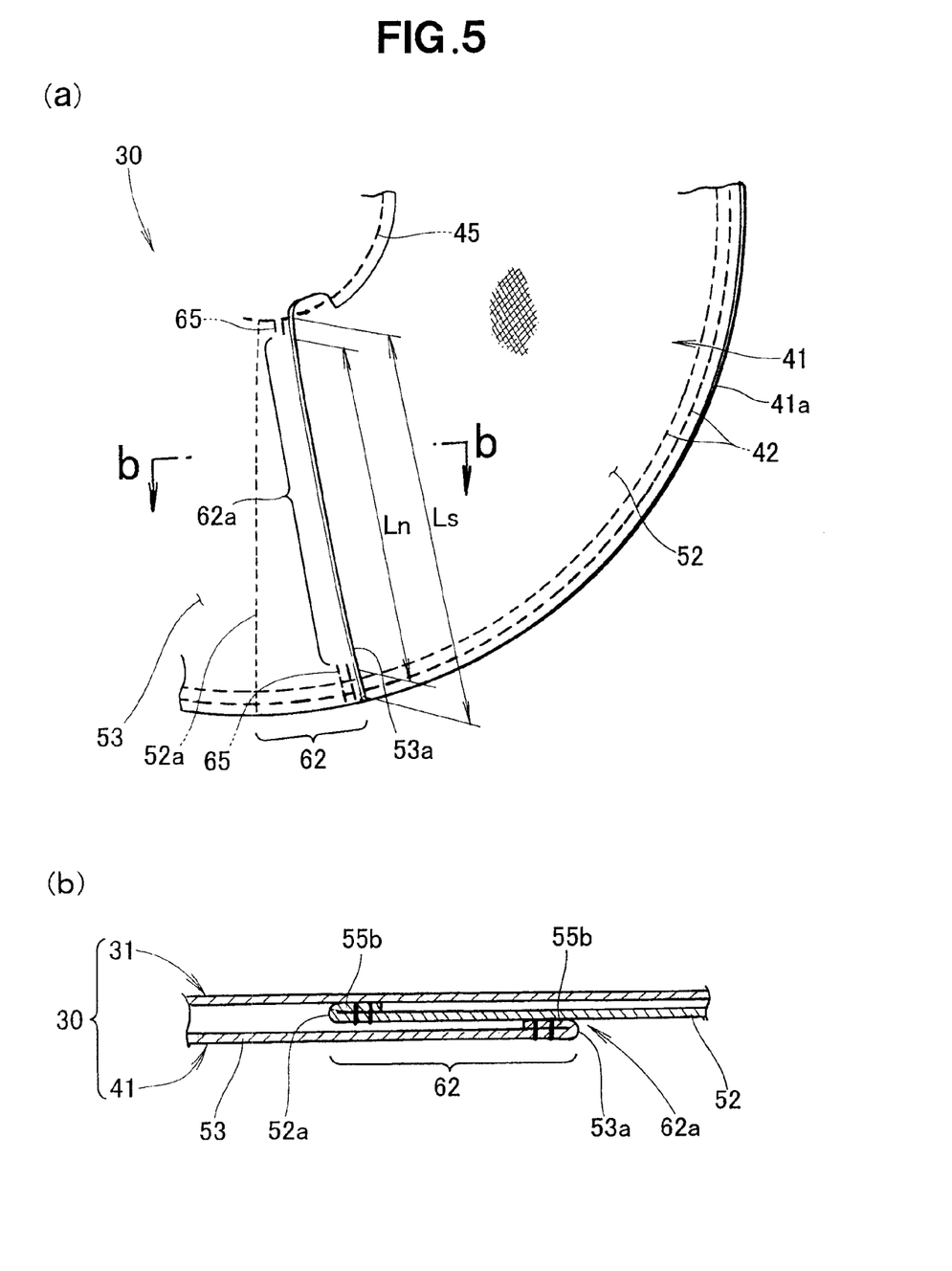

FIG. 5(a) shows an enlarged view of a second unjoined section 62a shown in FIG. 2. FIG. 5(b) is an enlarged cross-sectional view taken along line b-b of FIG. 5(a).

At least some of the overlapping parts 61 to 63 are configured as so-called unjoined sections 61a to 63a, which are not joined together (not sewn integrally by a sutured part 65) as shown in FIGS. 2 and 5(a) and (b). These unjoined sections 61a to 63a are referred to respectively as a "first unjoined section 61a," the "second unjoined section 62a," and a "third unjoined section 63a."

These unjoined sections 61a to 63a are used in place of the conventionally known vent hole. The unjoined sections 61a to 63a are closed during the normal state in which the internal pressure of the airbag 30 is nil or low, and are opened according to the increase in internal pressure to be capable of ejecting gas when the internal pressure of the airbag 30 has reached a predetermined value. The unjoined sections 61a to 63a have lengths Ln, the maximum values thereof being the entire length Ls of the ends 51a, 52a, 53a in the circumferential direction of the fan parts 55, and the lengths Ln are set to optimal values that take into account the ejection starting pressure, the ejection rate, and the quantity of the gas ejected to the exterior from the airbag 30.

The plurality of unjoined sections 61a to 63a shown in FIG. 2 are positioned evenly in the circumferential direction about the center CP of the circle, and these sections extend in a radial formation with respect to the center CP.

Figure 6:
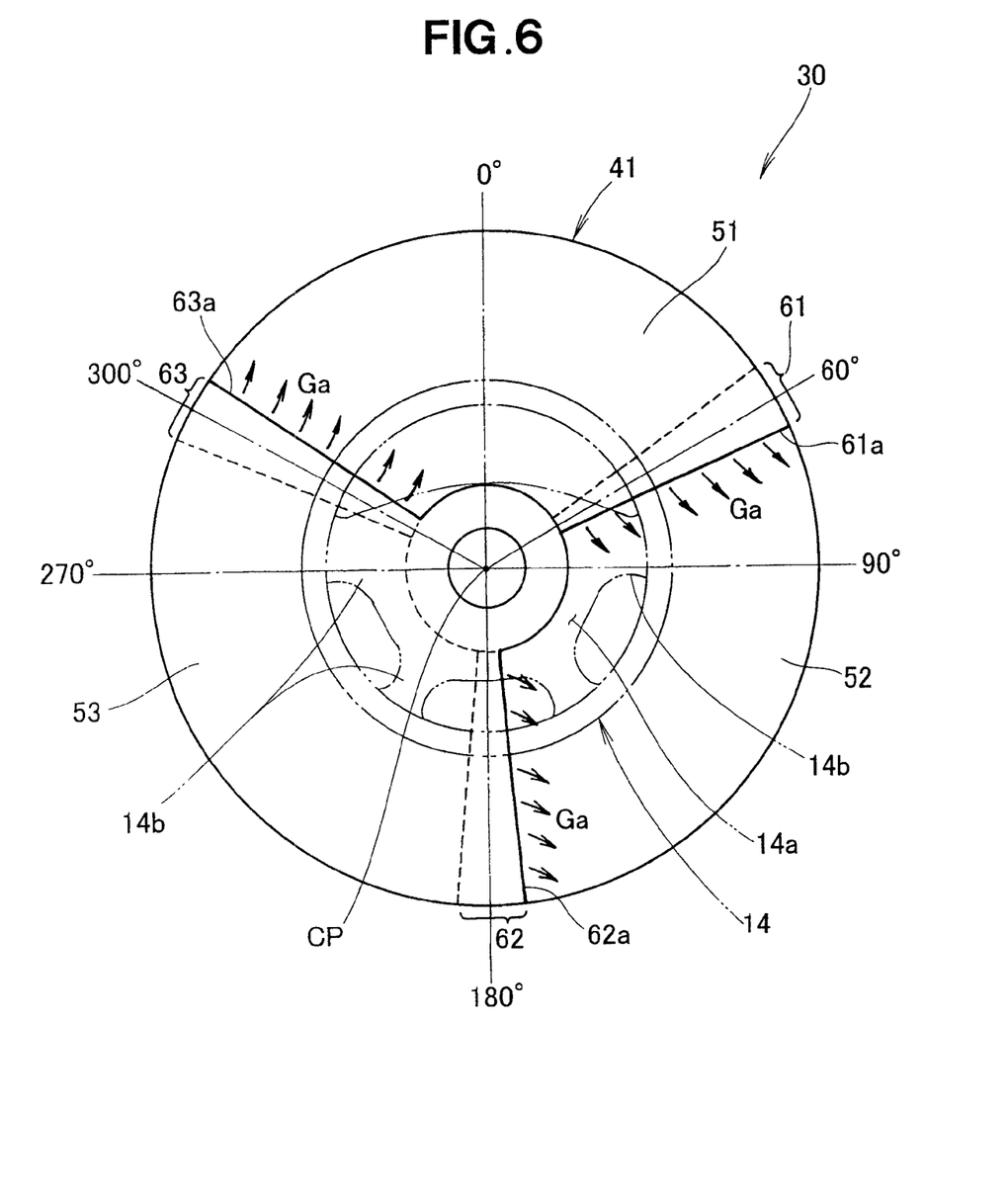
FIG. 6 is a view showing the relationship between a steering wheel and the airbag shown in FIG. 2.

It is known that spokes 14b of the steering wheel 14 are commonly positioned mostly in the bottom half of the steering wheel 14 in a steering neutral state, as shown in FIGS. 1 and 6. In other words, the spokes 14b are mostly positioned in the range of the points 90° to 270°. Accordingly, the first overlapping part 61 and the first unjoined section 61a are positioned at the point 60°, and the third overlapping part 63 and the third unjoined section 63a are positioned at the point 300°, as described above. Therefore, when the airbag 30 deployed in the passenger compartment 11 is viewed from the back surface, the plurality of unjoined sections 61a to 63a are positioned such that at least some of the unjoined sections 61a to 63a do not overlap the spokes 14b of the steering wheel 14.

Therefore, when the gas inside the airbag 30 is ejected to the exterior from the first and third unjoined sections 61a, 63a, the ejected gas Ga can flow into the passenger compartment 11 (see FIG. 1) without being blocked by the spokes 14b. Consequently, excess gas Ga inside the airbag 30 can be ejected to the exterior quickly and reliably.

Next, the operation of the airbag device 20 according to the first embodiment will be described.

When at least a predetermined amount of collision energy acts on the vehicle 10 (see FIG. 1), the inflator 21 shown in FIG. 3 receives an ignition signal and ignites the gas-forming agent, thereby generating gas and supplying the gas to the airbag 30. The airbag 30 accommodated in a folded up state on the steering wheel 14 (see FIG. 1) begins to be deployed by the supplied gas. During the process of the airbag 30 deploying, a cover (not shown) mounted on the steering wheel 14 ruptures from a tear line and forms an opening for the airbag 30 to project through. As a result, the airbag 30 begins to deploy into the passenger compartment 11.

FIG. 7(a) schematically depicts the airbag 30 seen from the front side of the vehicle 10, and corresponds to FIG. 2.

FIG. 7(b) shows a cross section taken along line b-b of FIG. 7(a).

FIG. 7(c) schematically depicts the airbag 30 when it has fully deployed, and corresponds to FIG. 7(b).

FIG. 7(d) shows on enlarged scape the second unjoined section 62a shown in FIG. 7(c).

FIGS. 7(e) through 7(g) illustrate a manner which the second unjoined section 62a shown in FIG. 7(d) changes according to the increase in internal pressure pb.

FIG. 7(h) schematically depicts the airbag 30 in the state of FIG. 7(g).

FIG. 7(i) shows on enlarged scape the second unjoined section 62a while opening in the state of FIG. 7(h).

During the initial state shown in FIGS. 7(a) and (b), when gas begins to be supplied from the inflator 21 (FIG. 3) to the airbag 30, the airbag 30 deploys as the supplied gas quantity increases, and as a result, deployment into the passenger compartment 11 (FIG. 1) completes as shown in FIG. 7(c).

As the internal pressure pb increases, the plurality of base cloths 51 to 53 are pulled in the circumferential direction (in the direction of the arrows Te, Te) about the center CP of the circle, along the surface of the front-side sheet 41. However, the internal pressure pb of the airbag 30 at this state of deployment completion is comparatively low. Since the pressure difference between the inside and outside of the airbag 30 is small, the unjoined sections 61a to 63a are closed as shown in FIGS. 7(c) and (d). Therefore, there is a small leakage quantity of gas Ga inside the airbag 30 leaking out to the exterior from the unjoined sections 61a to 63a. In other words, merely with the airbag deployed, the internal pressure pb does not reach a certain reference pressure set in advance. Therefore, the airbag 30 essentially preserves its deployed shape.

The vehicle occupant Mn shown in FIG. 1 then collides with the airbag 30 (a secondary collision). The airbag 30 changes shape due to the vehicle occupant Mn colliding. As a result, the internal pressure pb of the airbag 30 further increases. Due to the internal pressure pb increasing to a reference pressure, the plurality of base cloths 51 to 53 are further pulled in the circumferential direction about the center CP of the circle, along the surface of the front-side sheet 41. Moreover, along with the shape change in the airbag 30, the plurality of base cloths 51 to 53 is further pulled in the circumferential direction about the center CP of the circle, along the surface of the front-side sheet 41.

Since the plurality of unjoined sections 61a to 63a extends in a radial formation with respect to the center CP of the circle, the overlap widths θ2 of the overlapping parts 61 to 63 in the unjoined sections 61a to 63a are reduced by the pulling action in the circumferential direction about the center CP of the circle. In other words, the overlap widths θ2 shift so as to decrease in the sequence shown in FIGS. 7(e) and (f). The unjoined sections 61a to 63a are then completely opened as shown in FIGS. 7(g) and (h).

Thus, the unjoined sections 61a to 63a essentially begin to open from the stage in which the vehicle occupant Mn (the protected object Mn) collides with the deployed airbag 30. In other words, the unjoined sections 61a to 63a open in the sequence of FIG. 7(f) and FIG. 7(g), and the excess gas Ga inside the airbag 30 is ejected to the exterior. FIG. 7(h) and FIG. 7(i) represent a state in which a large quantity of excess gas Ga inside the airbag 30 is ejected by the unjoined sections 61a to 63a opening by a large amount. Due to the excess gas Ga being ejected to the exterior from the unjoined sections 61a to 63a, excessive increases in the internal pressure pb of the airbag 30 are prevented. As a result, the collision energy when the vehicle occupant Mn collides with the airbag 30 can be efficiently alleviated.

Moreover, since the plurality of unjoined sections 61a to 63a extend in a radial formation with respect to the center CP of the circle, the pulling action in the circumferential direction about the center CP of the circle can be effectively utilized to begin to reliably open the unjoined sections 61a to 63a with the proper timing.

Furthermore, according to the first embodiment, the ejection timing, the ejection rate, and the ejected quantity of the gas Ga ejected to the exterior from the unjoined sections 61a to 63a can be precisely set according to the collision mode of the vehicle occupant Mn (the protected object Mn) colliding with the deployed airbag 30. There can be considered, for example, a first collision mode and a second collision mode.

The first collision mode is a mode in which the head Hd of the vehicle occupant Mn collides with the top end part (the outer peripheral section) of the airbag 30 deployed as shown in FIG. 1. In this mode, the head Hd collides with the outer peripheral section of the airbag 30 in a so-called radial direction from radially outward toward the center (in the direction of arrow Fs), when the airbag 30 having been deployed into the passenger compartment 11 is viewed from the vehicle occupant Mn side, as shown in FIG. 1, for example.

Figure 7:
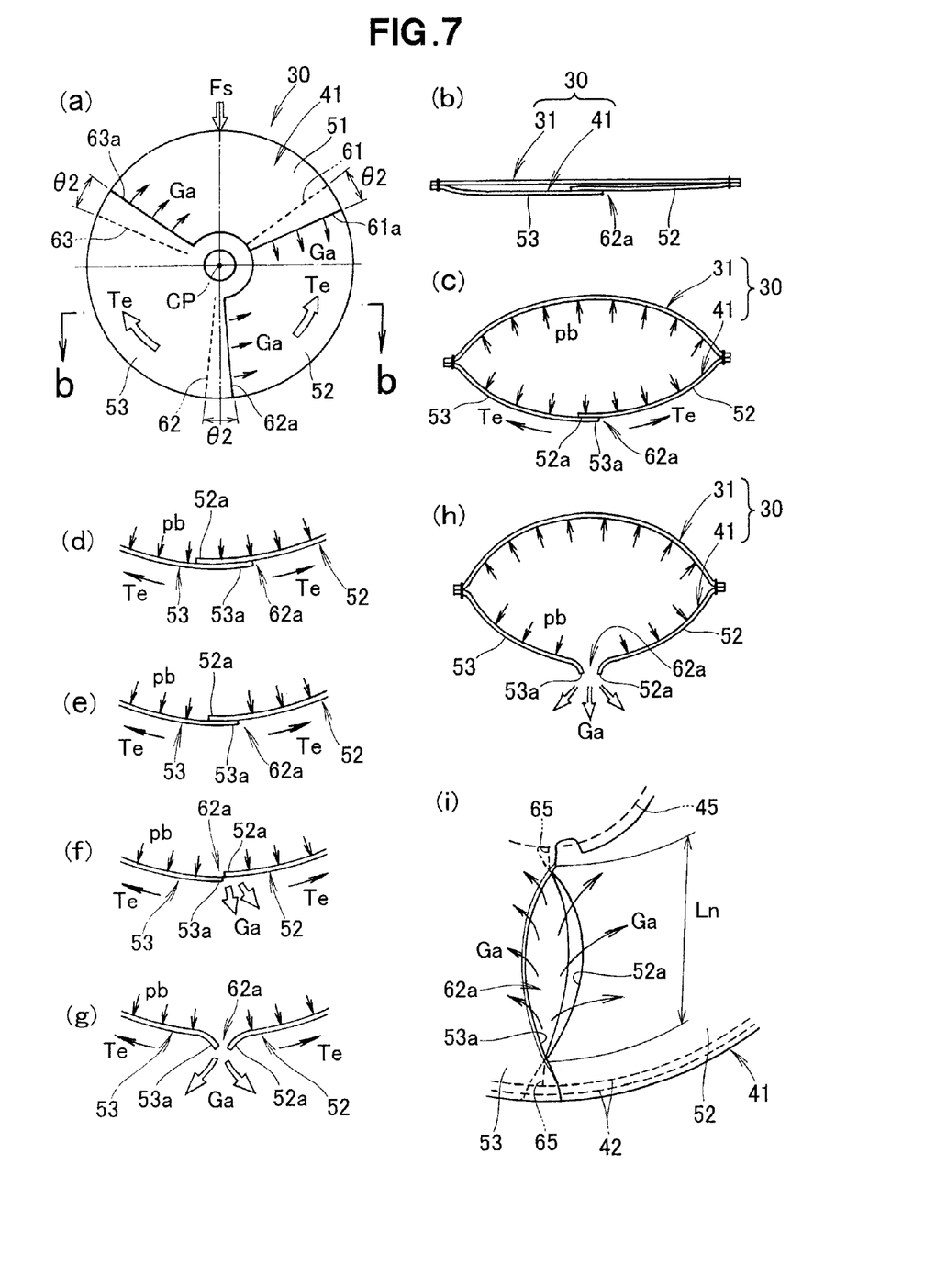

In the case of the first collision mode, the shape of the airbag 30 readily collapses (or deforms) locally due to the collision energy (the secondary collision energy) when the head Hd collides with the airbag 30. As a result, the force whereby the base cloths 51 to 53 are pulled in the direction of the arrows Te, Te increases, as shown in FIG. 7. Therefore, some of the unjoined sections 61a to 63a locally open readily, and the ejected quantity of the gas Ga ejected to the exterior from the unjoined sections 61a to 63a therefore increases. A large quantity of the gas Ga is quickly ejected and the secondary collision energy is sufficiently absorbed, whereby a large amount of secondary collision energy inflicted on the vehicle occupant Mn can be sufficiently alleviated.

In the second collision mode, the chest Ch of the vehicle occupant Mn collides with the front surface of the airbag 30 deployed as shown in FIG. 1. In the case of the second collision mode, the shape of the airbag 30 is preserved comparatively readily despite the secondary collision energy. Since the unjoined sections 61a to 63a open less readily than in the case of the first collision mode, the ejected quantity of the gas Ga ejected to the exterior from the unjoined sections 61a to 63a is smaller. Due to the smaller ejected quantity, a large amount of secondary collision energy can be sufficiently absorbed by the entire airbag 30.

Thus, at least one value among the number of unjoined sections 61a to 63a, the overlap widths θ2 of the overlapping parts 61 to 63 in the unjoined sections 61a to 63a, and the lengths Ln of the unjoined sections 61a to 63a is set such that from the stage in which the airbag 30 expands and begins to contact the vehicle occupant Mn (the protected object Mn), the unjoined sections 61a to 63a begin to open according to the increase in the internal pressure pb of the airbag 30.

As is clear from the above description, in the first embodiment, the plurality of base cloths 51 to 53 constituting the back surface of the airbag 30 is arranged along the back surface and only the adjacent ends 51a, 52a, 53a overlap each other, constituting the overlapping parts 61 to 63. At least some of the overlapping parts 61 to 63 are configured as unjoined sections 61a to 63a which are not joined together.

The ejection timing, the ejection rate, and the ejected quantity of the gas Ga ejected to the exterior from the unjoined sections 61a to 63a can be precisely controlled in accordance with the collision mode of the vehicle occupant Mn against the deployed airbag 30.

The overlap widths θ2 and the lengths Ln of the unjoined sections 61a to 63a may be set to separate values with each of the respective unjoined sections 61a, 62a, and 63a.

Second Embodiment

Figure 8:
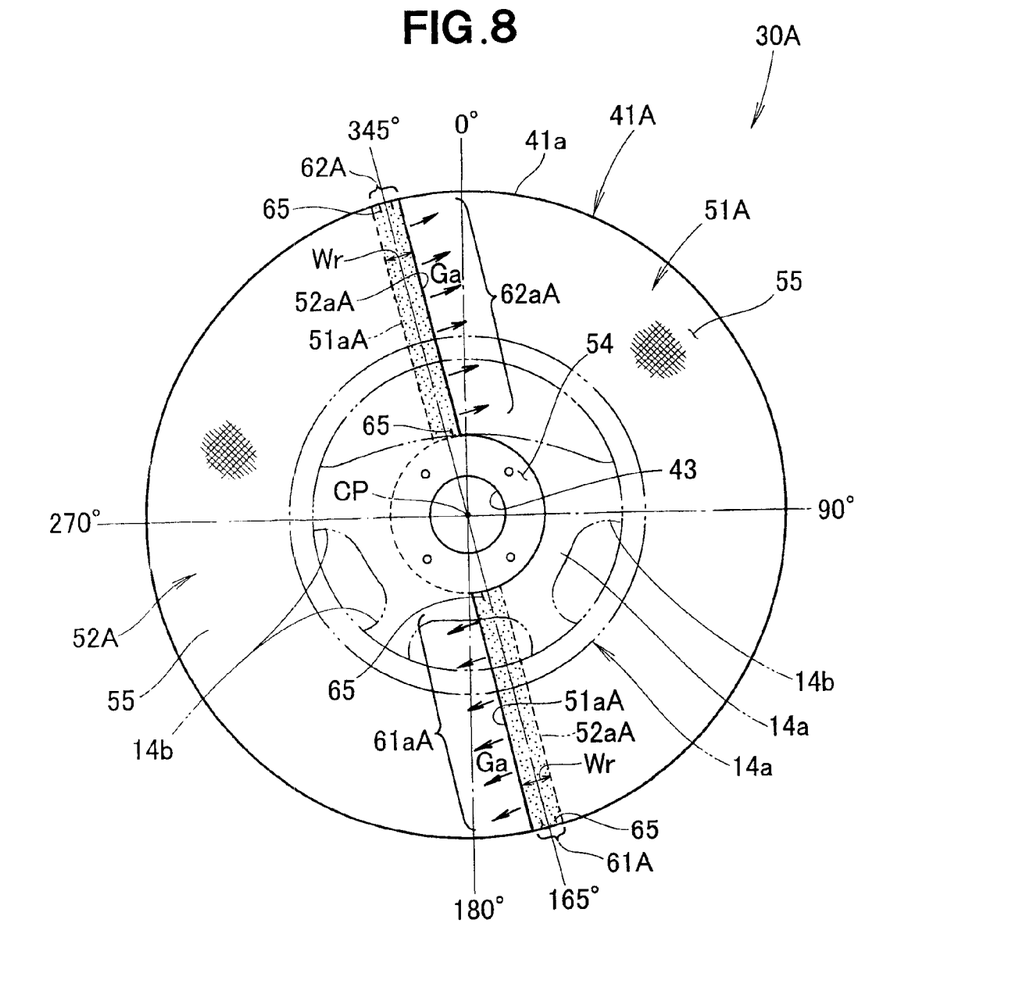
FIG. 8 is a view of an enlarged configuration of an airbag according to a second embodiment of the present invention as seen from the front side of the vehicle.

An airbag according to a second embodiment of the present invention will next be described. FIG. 8 shows the configuration of an airbag 30A of the second embodiment, seen from the front side of the vehicle 10 (FIG. 1).

In the airbag 30A according to the second embodiment, a front-side sheet 41A is formed by two base cloths 51A, 52A. The first base cloth 51A and the second base cloth 52A are set in essentially the same size. The base cloths 51A, 52A have essentially the same configuration as the base cloths 51, 52 of the first embodiment.

First and second overlapping parts 61A, 62A have the same configuration as the first and second overlapping parts 61, 62 of the first embodiment. The overlap widths Wr of the overlapping parts 61A, 62A have a certain width. First and second unjoined sections 61aA, 62aA have the same configuration as the first and second unjoined sections 61a, 62a of the first embodiment.

The first overlapping part 61A and the second overlapping part 62A are positioned in point symmetry with each other with respect to the center CP. For example, the first overlapping part 61A and the first unjoined section 61aA are positioned at the point 165°, and the second overlapping part 62A and the second unjoined section 62aA are positioned at the point 345°.

The airbag 30A of the second embodiment having this configuration exhibits the same operation and effects as the airbag 30 of the first embodiment. Furthermore, when the gas Ga inside the airbag 30A is ejected to the exterior from the first and second unjoined sections 61aA, 62aA, the ejected gas Ga can flow into the passenger compartment 11 (FIG. 1) while being mostly unblocked by the spokes 14b. Consequently, the excess gas Ga inside the airbag 30A can be quickly and reliably ejected to the exterior.

In first embodiment, the unjoined sections 61a to 63a are preferably configured on at least some of the plurality of overlapping parts 61 to 63. For example, the configuration may be one in which the first unjoined section 61a is provided in the first overlapping part 61 and the third unjoined section 63a is provided in the third overlapping part 63, but an unjoined section is not provided in the second overlapping part 62. Similarly, in the second embodiment, unjoined sections 61aA to 63aA are preferably configured on at least some of the plurality of overlapping parts 61A, 62A.

INDUSTRIAL APPLICABILITY

The airbags 30, 30A of the present invention are suitable for use in the vehicle airbag device 20 for restraining and protecting a vehicle occupant Mn sitting in the driver seat 12 or the passenger seat 13 of the vehicle 10 by deploying in front of the vehicle occupant Mn. Furthermore, the airbags 30, 30A of the present invention are suitable for use as side airbags for restraining and protecting a vehicle occupant Mn sitting in the passenger compartment 11 by deploying to the side of the vehicle occupant Mn. Furthermore, the airbags 30, 30A of the present invention are suitable for use as pedestrian-protecting airbags for protecting pedestrians by being provided to the hood of the vehicle 10, for example, and deploying to the vehicle exterior.

REFERENCE SIGNS LIST

10 Vehicle
14 Steering wheel
14a Hub
14b Spoke
30, 30A Airbags
31 Rear-side sheet (first sheet)
41 Front-side sheet (second sheet)
51-53, 51A, 52A Plurality of base cloths
61-63, 61A, 62A Overlapping parts
61a-63a, 61aA, 62aA Unjoined sections
CP Center of circular back surface
Ln Length of unjoined section
Mn Protected object (vehicle occupant)
pb Internal pressure of airbag
Wr, θ2 Overlap width

The invention claimed is:

1. An airbag comprising a first sheet near a protected object, and a second sheet far from the protected object, wherein outer peripheral parts of the first sheet and the second sheet are joined, characterized in that:
   the second sheet is formed by a plurality of divided base cloths;
   the base cloths are arrayed along a circumferential direction and have overlapping parts where adjacent ends are overlapping;
   at least some of the overlapping parts have unjoined sections not joined together; and
   when the airbag deploys and the protected object collides therewith, a gas can be ejected through the unjoined sections.

2. The airbag of claim 1, wherein the second sheet is cirvular in overall shape,
   each of the base cloths is formed into a fan shape with reference to a center of the circular second sheet, and
   the unjoined sections extend in a radial direction with reference to the center of the circular second sheet.

3. The airbag of claim 1, wherein at least one value among the number of the unjoined sections, an overlap width of the overlapping parts in the unjoined sections, and a length of the unjoined sections is set such that the unjoined sections begin to open from a stage in which the protected object collides with the deployed airbag.

4. The airbag of claim 2, wherein the airbag is accommodated in a hub (14a) of a vehicle steering wheel, and the unjoined sections are positioned such that at least some of the unjoined sections do not overlap a spoke of the vehicle steering wheel when the airbag deployed in a passenger compartment is viewed from a front side of the vehicle.

5. The airbag of claim 4, wherein the unjoined sections are plural in number and the plural unjoined sections are positioned evenly in the circumferential direction with reference to the center of the circular second sheet.

\* \* \* \* \*